(12) United States Patent
Habas

(10) Patent No.: US 9,105,198 B2
(45) Date of Patent: Aug. 11, 2015

(54) VISUAL AND TACTILE DISPLAY

(76) Inventor: Noa Habas, Tel Aviv (IL)

( * ) Notice: Subject to any disclaimer, the term of this patent is extended or adjusted under 35 U.S.C. 154(b) by 93 days.

(21) Appl. No.: 13/581,802

(22) PCT Filed: Feb. 28, 2011

(86) PCT No.: PCT/IL2011/000194
§ 371 (c)(1),
(2), (4) Date: Aug. 30, 2012

(87) PCT Pub. No.: WO2011/107982
PCT Pub. Date: Sep. 9, 2011

(65) Prior Publication Data
US 2012/0319981 A1 Dec. 20, 2012

Related U.S. Application Data

(60) Provisional application No. 61/309,011, filed on Mar. 1, 2010.

(51) Int. Cl.
*G09B 21/00* (2006.01)

(52) U.S. Cl.
CPC ............ *G09B 21/008* (2013.01); *G09B 21/003* (2013.01)

(58) Field of Classification Search
None
See application file for complete search history.

(56) References Cited

U.S. PATENT DOCUMENTS

| | | | |
|---|---|---|---|
| 5,580,251 A * | 12/1996 | Gilkes et al. | 434/113 |
| 5,942,970 A | 8/1999 | Norman | |
| 6,230,135 B1 * | 5/2001 | Ramsay et al. | 704/271 |
| 6,747,631 B1 * | 6/2004 | Sakamaki et al. | 345/157 |
| 2003/0132915 A1 * | 7/2003 | Mitchell | 345/168 |
| 2004/0008871 A1 * | 1/2004 | Smith | 382/114 |
| 2005/0135198 A1 * | 6/2005 | Wellen | 368/230 |
| 2009/0130639 A1 * | 5/2009 | Skinner | 434/114 |
| 2011/0012716 A1 * | 1/2011 | Miller, IV | 340/407.2 |
| 2011/0012828 A1 * | 1/2011 | Nagai et al. | 345/156 |
| 2011/0111375 A1 * | 5/2011 | Luu et al. | 434/114 |
| 2012/0299853 A1 * | 11/2012 | Dagar | 345/173 |
| 2013/0330692 A1 * | 12/2013 | Karasin et al. | 434/113 |

FOREIGN PATENT DOCUMENTS

| | | | | |
|---|---|---|---|---|
| GB | 2384063 | * | 7/2003 | ............ G04B 19/20 |
| WO | 9730415 A1 | | 8/1997 | |
| WO | 03050754 A1 | | 6/2003 | |
| WO | 2009097866 A1 | | 8/2009 | |

OTHER PUBLICATIONS

Combined search report/written opinion for parent PCT application No. PCT/IL2011/000194, mailed Jul. 11, 2011.

* cited by examiner

*Primary Examiner* — William Boddie
*Assistant Examiner* — Bipin Gyawali
(74) *Attorney, Agent, or Firm* — Graeser Associates International Inc; Dvorah Graeser

(57) ABSTRACT

The present invention relates to a device, system and apparatus for a visual and tactile display and in particular, to a tactile and visual display device system capable of displaying both alphanumeric and Braille characters in a manner suitable for individuals that are visually impaired, blind or having normal range vision.

49 Claims, 11 Drawing Sheets

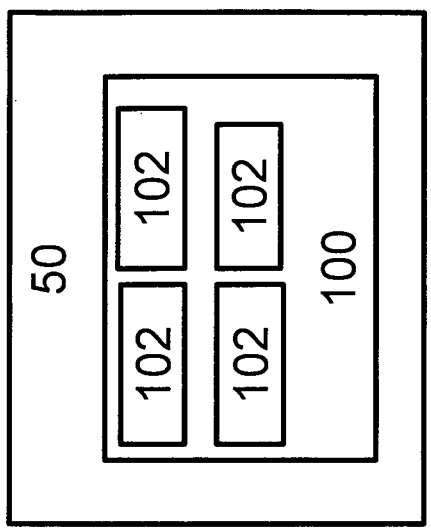
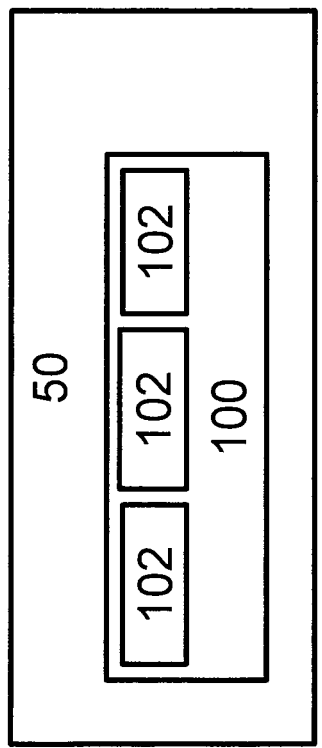
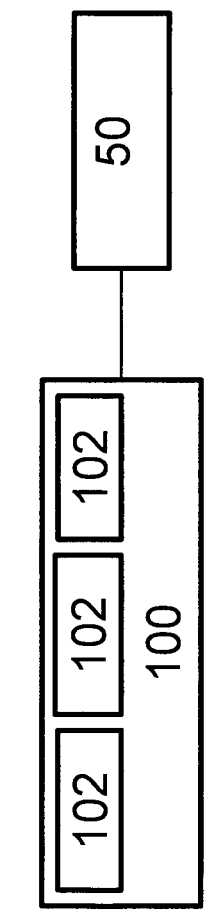
FIG. 1A
FIG. 1B
FIG. 1C

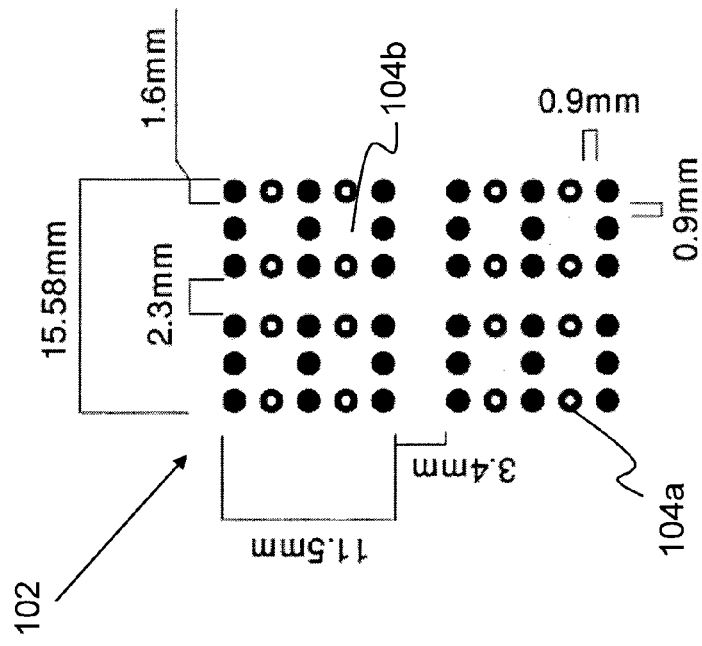
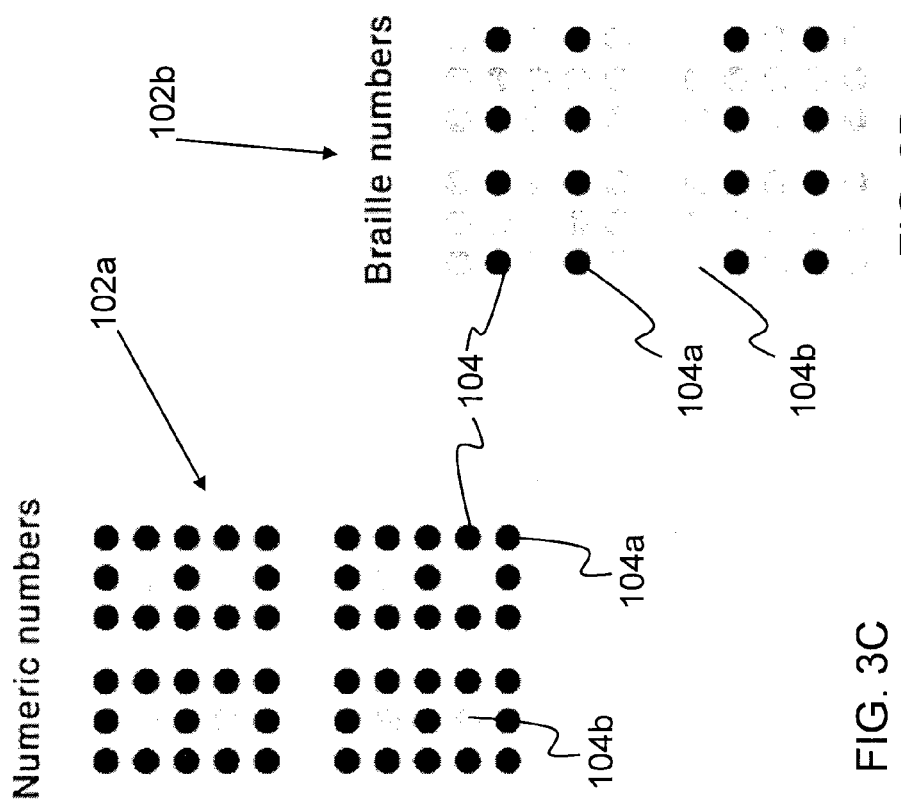
FIG. 3A
FIG. 3B
FIG. 3C

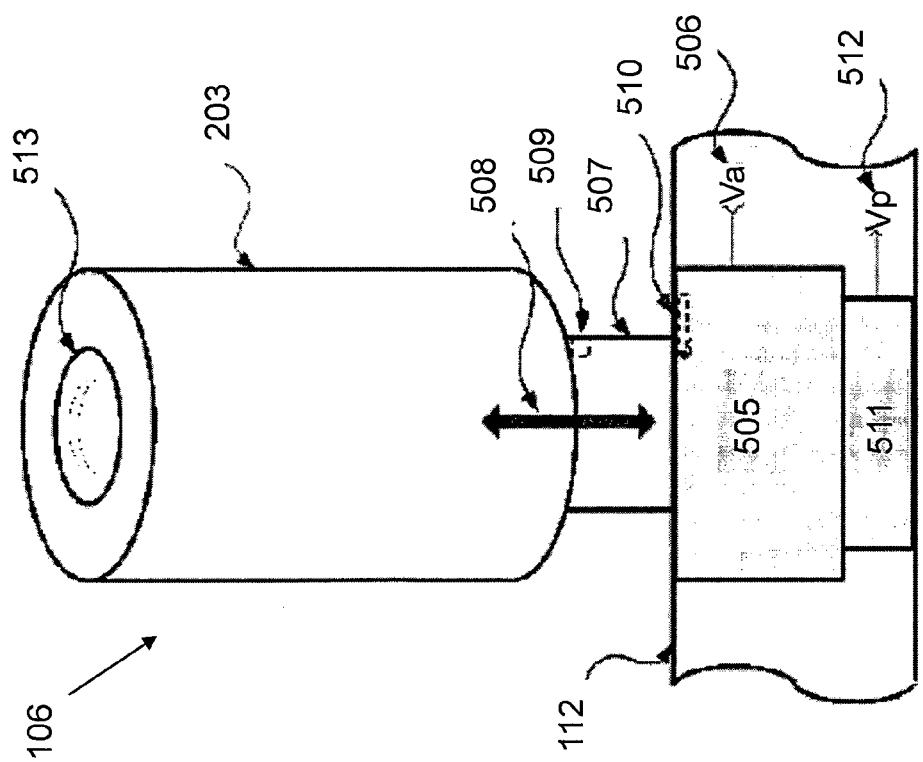

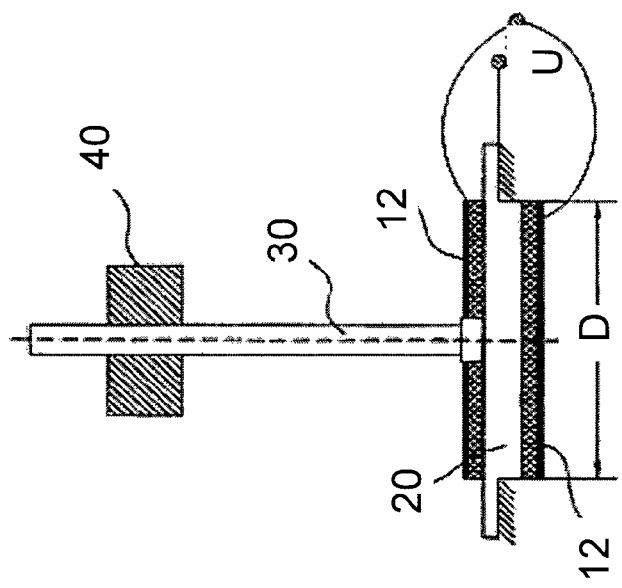
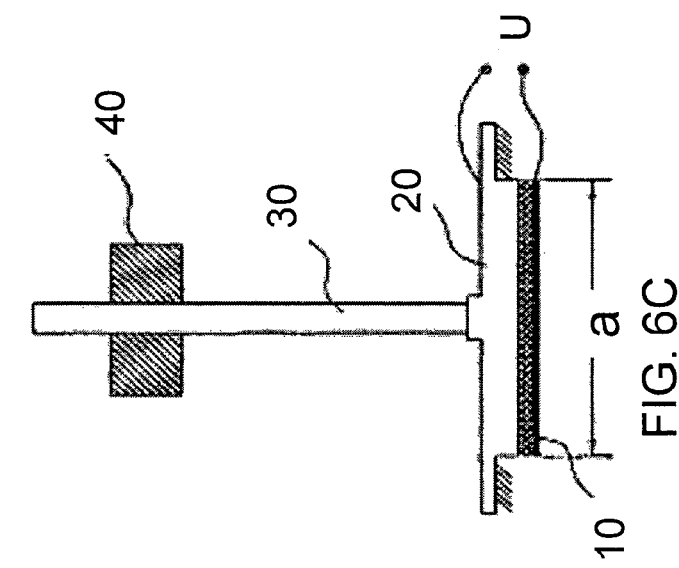
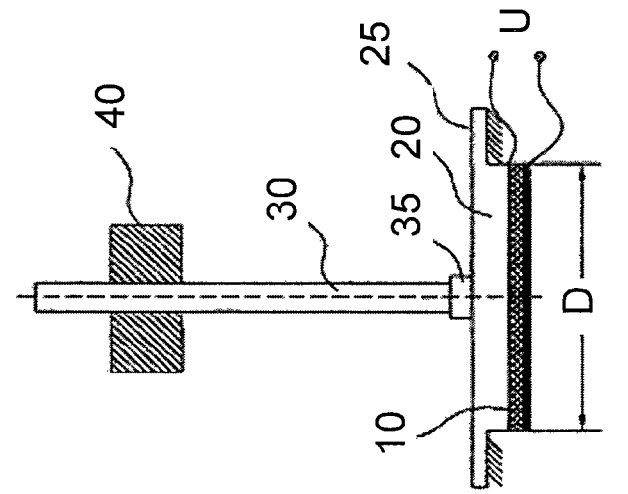

VISUAL AND TACTILE DISPLAY

CROSS-REFERENCE TO RELATED APPLICATIONS

This Application is a national phase of, and claims priority from, PCT Application No. PCT/IL2011/000194, filed on Feb. 28, 2011, which claims priority from U.S. Provisional Application No. 61/309,011, filed on Mar. 1, 2010, both of which are hereby incorporated by reference as if fully set forth herein.

FIELD OF THE INVENTION

The present invention relates to a device, system and apparatus for a visual and tactile display and in particular, to a tactile and visual display device system capable of displaying both alphanumeric and Braille characters in three dimensions in a manner suitable for individuals that are visually impaired, blind or having normal range vision.

BACKGROUND OF THE INVENTION

Tactile displays are generally made and marketed toward a particular population sector that of the visually impaired, blind, or where there is insufficient ambient light for visually determining the content of a display. Similarly visual displays are also marketed and geared toward a particular market of individuals within normal seeing/visual range.

Generally devices such as normal house utility articles such as microwave ovens, blender, clocks, have been developed for the visually impaired or blind where they are generally provided with audible cues to allow for conveying a message to a visually impaired individual.

Furthermore displays that would otherwise be dynamic are generally presented to the visually impaired in the form of audible cues via a speaker, rather than tactile cues. For example a watch may be provided as a Braille-like watch based on dot system U.S. Pat. No. 5,311,487 to Mininni, or as a tactile watch U.S. Pat. No. 7,079,454 to Wellen. However neither watch face may be properly interpreted by both a visually impaired individual or by an individual that has normal visual and/or seeing range.

SUMMARY OF THE INVENTION

There is an unmet need for, and it would be highly useful to have, a tactile and visual display capable of both conveying a message to individuals that are visually impaired or blind utilizing cues that are tactile and that may be interpreted via touch, while conveying the same message to an individual with normal range vision utilizing visual cues.

The present invention overcomes the deficiencies of the background by providing a device, system and apparatus capable of providing a multipurpose display that may be readily interpreted and/or understood both by visually impaired individuals as well as individual with normal range vision. The present invention overcomes the deficiencies of the prior art as it offers a display device, system and apparatus that may be equally understood by or communicated to both a visually impaired individual and an individual with normal range vision, optionally and preferably simultaneously. A tactile display for visually impaired individuals characterized in that it provides for readily displaying Braille characters and does not provide for displaying alphanumeric characters utilizing the same system. Similarly visual displays for normal range seeing individuals is not adapted for Braille character display incorporating Braille character spacing rules. Specifically visual displays do not take into account the spacing required to convey a message tactually.

A preferred embodiment of the present invention provides for both a visual and tactile display that is characterized in that that it is adapted to readily display both to the visually impaired and to individuals with normal seeing range vision while providing a three dimensional dimension display that may be equally understood by both tactile and visual means.

Most preferably the display device of the present invention is configured to account for the limitation of a tactile display, for example inter pixel distance and/or relative pixel allocation, while producing a visual display.

An optional embodiment of the present invention provides a tactile and visual display that is configured to provide both a Braille character tactile display simultaneously with a corresponding visual display of alphanumeric characters.

A preferred embodiment of the present invention provides a visual and tactile display device both for conveying an image and/or message comprising:

i. at least one or more display panels wherein each display panel comprises a plurality of pixels wherein each pixel may be individually maneuvered with an actuator to be raised or lowered from an initial position to a display position to convey image and/or message in three dimensions and wherein conveyed image may be sensed visually and/or sensed tactually; and characterized in that pixels are arranged relative to one another to provide for both a visual and tactile display of alphanumeric characters and Braille characters; and ii. wherein display panel comprises at least 15 pixels arranged in 3 column and 5 row matrix arrangement wherein the inter pixel distance between adjacent pixels may be about 0.9 mm.

Optionally the pixels may be raised or lowered with actuator optionally up to about 10 mm 0.9 mm 0.8 mm, 0.7 mm, 0.6 mm, 0.5 mm, 0.4 mm, 0.3 mm, 0.2 mm, 0.15 mm, 0.10 mm, optionally and most preferably at least 0.5 mm. More preferably the pixels may be maneuvered from at least 0.3 mm up to about 0.8 mm. Most preferably the pixels may be maneuvered from at least 0.5 mm.

Optionally the display panel may be characterized by a display area size corresponding to about 15.5 mm×11.6 mm.

Optionally the device may comprise two adjacent panels arranged such that a second display panel may be placed 2.3 mm to right or left relative to a first display panel.

Optionally the display device may comprise two display panels arranged such that a second display panel may be disposed 3.4 mm above or below a first display panel.

Optionally the display device comprising a plurality of display panels relative to a first panel wherein an adjacent neighboring panel disposed to the right and/or left of first panel may be placed at a distance of 2.3 mm relative to first panel; and an adjacent neighboring panel disposed above or below first panel may be placed at a distance of 3.4 mm relative to first panel.

Optionally the device may for example include but is not limited to four display panels in a 2 column and 2 row (2×2) matrix form.

Optionally a pixel may comprise a cross section equivalent to about 1.6 mm.

Optionally the pixel may be provided with a face shape for example including but not limited to square, rectangle, round, hexagon, octagon, pentagon, polyhedral, tetrahedral, triangular, heart, smiley, emoticon, spherical, cylindrical, elliptical, shape, geometric shape, image, cartoon character, caricature in any combination thereof or the like.

Optionally and most preferably the display panel may convey alphanumeric characters, Braille characters and/or a combined character.

Optionally and preferably a display panel provides for communication both visually and tactically by presenting both alphanumeric and Braille characters simultaneously about the same display panel providing a combined display.

Optionally and preferably a combined display may be provided for displaying Braille characters pixel and alphanumeric character pixel with a height differential of at least 0.5 mm, Braille characters are presented with a height of at least 0.5 mm relative to a base surface, alphanumeric characters are raised with a height of up to about 0.8 mm relative to a base surface.

Optionally the actuator may be a piezoelectric linear motor providing a force of up to 10 g.f.

Optionally the display panel may be characterized in that it may display at least one alphanumeric characters in a non-block form. Optionally the display may be characterized in that it may display at least two or more alphanumeric characters in a non-block form.

Optionally and preferably the display device may further comprise a controller, for example in the form of a microcontroller, and a communication module and a power supply. Optionally power supply may be provided in the form of a rechargeable batter, battery, capacitor, supercapacitor, photoelectric cell or the like.

Optionally the piezoelectric actuator may be controlled for example with a controller comprising a communication module providing for wireless, wired, cellular, Bluetooth, optical, RF, IR communication, or the like in any combination thereof.

Optionally the image conveyed on the display device may for example include but is not limited to time, image, date, message, alarm, reminder, name tag, identification, address, SMS, email, or any combination thereof.

Optionally the display device may further comprise a modulation module for receiving data and modulating data to a format that may for example be displayed on display. Optionally data may be provided in digital and/or analog form.

Optionally and preferably a plurality of display panels may be coupled or otherwise associated with one another.

Most preferably the actuators maneuver a pixel by raising or lowering the appropriate pixels from an initial position, to a display position and back to the initial position. Optionally the time to maneuver a pixel either for raising or lowing from the initial position to a display position may be up to about 5 (five) seconds, for example. Optionally the time to maneuver a pixel either for raising or lowing from the initial position to a display position may be up to about 2 (two) or 3 (three) seconds, for example.

Optionally a pixel may be maintained in the display position for up to about 60 seconds.

Optionally and more preferably the pixel may be maintained in the display position for about 10 seconds.

Optionally each pixel may be moved relative to at least one or a plurality of neighboring pixels.

Optionally the pixels may be touch activated to provide a display.

Optionally the pixel's are manually activated to provide a display. Optionally and preferably the image display may be activated for a finite period of time. Optionally the finite period of time may be determined based on user control, available resources, for example including but not limited to available power resources or the like.

Optionally the pixels may be provided in the form of light emitting diode (LED).  Optionally the LED pixels may be used to display a two dimensional background image. Optionally the LED pixels may be used to display a three dimensional image, for example a hologram or the like on two dimensional surface for example as a background image.

Optionally a two dimensional background image may be displayable while pixel are activated.

Optionally the modulation module provides for importing images for display. Optionally an image may be formed by relatively controlling specific pixels for example including but not limited to background pixels controlling image forming pixels, both image forming and background pixel, control of both lighting and height, or the like.

Optionally individual display panel comprises a corresponding an individual sub-controller.

An optionally embodiment provides for a watch comprising a plurality of display panels concatenated, coupled and/or otherwise associated with one another forming a watch band.

Optionally and preferably display device according to optional embodiments may be coupled, integrated, and/or otherwise coupled with optional auxiliary devices, devices, surfaces or the like, for example including but not limited to article of clothing, jewelry, computer, mobile telephone, PDA, mobile telecommunication device, medical device, ornamental watch, TV, radio, computer, household device, household appliances, washing machine, dryer or the like.

Optionally control of the display device may be provided by an auxiliary device comprising a processor that may be coupled and/or associated therewith, for example including but not limited to computer, mobile telephone, PDA, mobile telecommunication device, medical device, ornamental watch, TV, radio, computer, household device, household appliances, washing machine, dryer or the like.

Optionally the display may further comprise voice activation where, for example, a display function may be activated based on voice recognition, or voice activated functions.

Optionally the device may further comprise a speaker for audibly communicating display content.

Optionally and preferably at least one or more pixels of the display panel may be provides with vibration to convey an image and/or message. Optionally pixels of the display panel forming Braille character display and/or combined character display may further comprise vibration to convey an image and/or message.

Optionally pixels may be activated via an activation signal communicated from the communication module.

 Optionally the signal activation may be in the form of an electronic message for example including but not limited to email or SMS.

Optionally the display device may alter displays between visually based display and tactile display. Optionally the device may provide for altering between a tactile display and a visually display.

Within the context of this application where reference is made to the units for force may be interchangeably referred to and provided using units of grams, gram-force, 'gf' and/or 'g' to refer to the SI unit of force, Newton and/or referenced shorthand 'N', such that 1 N of force is equivalent to 101.971621298 g or 1 g of force is equivalent to 0.00980665N, or multiples thereof, for example, 2gf–10 gf being equivalent to 0.0196133N–0.0980665N.

Unless otherwise defined the various embodiment of the present invention may be provided to an end user in a plurality of formats, platforms, and may be outputted to at least one of a computer readable memory, a computer display device, a printout, a computer on a network or a user.

Unless otherwise defined, all technical and scientific terms used herein have the same meaning as commonly understood by one of ordinary skill in the art to which this invention belongs. The materials, methods, and examples provided herein are illustrative only and not intended to be limiting. Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager. Any two or more of such devices in communication with each other, and/or any computer in communication with any other computer, may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A-C are schematic block diagram of an exemplary system according to an optional embodiment of the present invention;

FIG. 3A-C are schematic illustrations of a optional display panels according to an optional embodiments of the present invention adapted both for presenting Braille and alphanumeric characters while maintaining the Braille pixel allocation rules.

FIG. 6A-D is an schematic illustrative depiction of optional actuators utilized with the display panel according to an optional embodiment of the present invention;

FIG. 7B is an exploded view of watch of FIG. 7A.

DESCRIPTION OF THE PREFERRED EMBODIMENTS

Figure 2:
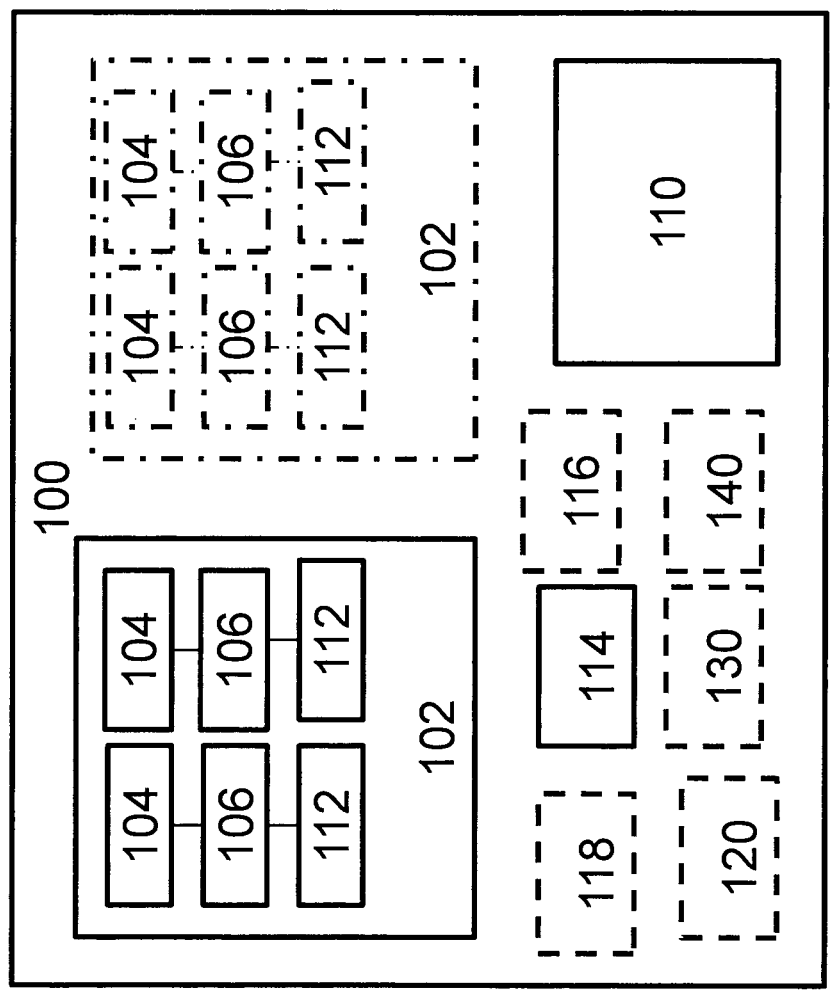
FIG. 2 is a schematic block diagram of an exemplary system according to an optional embodiment of the present invention.

The present invention in various optional embodiments overcomes the deficiencies of the background by providing a device, system and apparatus capable of providing a multi-purpose display that is readily interpreted understood both by visually impaired individuals as well as individual with normal range vision. The principles and operation of the present invention may be better understood with reference to the drawings and the accompanying description. The following figure reference labels are used throughout the description to refer to similarly functioning parts.

50 article, auxiliary device;
100 display device;
102 display panel
102a alphanumeric character display panel;
102b Braille character display panel;
102c combined character display panel;
104 pixel;
104a display active pixel;
104b display inactive pixel;
104c combination pixel;
106 pixel actuator;
106a initial position
106b display position
110 display controller;
112 actuator controller
114 power supply
116 display activation switch;
118 actuator activation switch;
120 communication module
130 modulation module
140 speakers
203,30 pixel actuator shaft Referring now to the drawings, FIGS. 1A-C are schematic block diagrams of optional tactile and visual display device 100 according to an preferred embodiment of the present invention for a visual and tactile display. Display device 100 includes at least one and more preferably a plurality of display panels 102. Optionally each display panel 102 provides for displaying at least one alphanumeric and/or Braille character. Optionally and preferably each display panel 102 provides for displaying at least two adjacent alphanumeric and/or Braille characters.

Optionally and more preferably each display panel 102 provides for displaying up to four adjacent alphanumeric and/or Braille characters in a 2 row and 2 column matrix form (2×2), for example as shown in FIG. 1C.

Optionally device 100 may be coupled, integrated or otherwise associated with an article and/or auxiliary device 50 for housing and/or associating with device 100. For example article 50 may be any article which may be associated with display 100. Optionally, article 50 may be any article onto which a display 100 may be coupled for example include but is not limited to a computer, watch, informational display, kitchen utilities, jewelry, exercise machines, medical devices or the like. For example, display 100 may be incorporated with an article of clothing or jeweler for example a watch Most preferably display device 100 comprises at least one or more display panels comprising a plurality of pixels 104 that may be controlled with an actuator 106 to form at least one or both of alphanumeric and/or Braille characters while the display panel 102 is configured to maintain the rules and limitations for ensuring appropriate Braille character recognition.

FIG. 1A depicts display device 100 comprising a plurality of display panels 102 where device 100 is coupled, integrated with article 50. Optionally article 50 and device 100 may be integrated with one another while sharing resource for example, available power supply.

FIG. 1B depicts display device 100 comprising a plurality of display panels 102 where device 100 is associated or coupled with article 50, however in this embodiment device 100 may be a standalone device without resource sharing with article 50 as seen in FIG. 1A.

Optionally and preferably display panel 102 is adapted for displaying both an alphanumeric and a Braille characters, with a plurality of pixels that are spaced apart according to Braille rules. Most preferably single character properties are provided by controlling the size, spacing and overall dimensions of a pixel 104 the number of pixels 104, as will be described in FIG. 3A-C below.

Optionally a plurality of display panels may be concatenated with one another to form a larger display area including a plurality of characters.

FIG. 2 provides a schematic block diagram of display device 100 comprising at least one or more display panels 102, a controller 110, power supply 114. Optionally device 100 further comprises an actuator activation switch 118 and a display activation switch 116. Optionally device 100 may further comprise a communication module 120, modulation module 130, speakers 140.

Most preferably controller 110 provides for controlling device 100 in all its constituents and may be realized as a microprocessor or the like.

Most preferably display panel 102 comprising a plurality of pixels 104 wherein individual pixels 104 may be individually manipulated, moved and/or maneuvered with an actuator 106 by raising or lowering a pixel 104 from an initial position 106a to a display position 106b and preferably back to the initial position 106a. Most preferably pixel 104 may be kept or maintained in a fixed position, most preferably the display position 106b, for a finite period of time, for example up to about 60 seconds, and more preferably up to about 10 seconds, and then returned to an initial position 106a.

Most preferably a pixel 104 is individually maneuvered with actuator 106 to be raised or lowered from an initial position 106a to a display position 106b to convey said image and/or message in three dimensions, such that the conveyed image and/or message may be sensed visually and/or tactually.

Optionally and preferably actuator 106 may be controlled with an actuator controller 112. Most preferably actuator controller 112 is controlled with and in communication with device controller 110.

Actuator 106 may for example be realized as an actuator, linear motor, piezoelectric linear motor, MEMS motor, magnetic motor, solenoid based shift mechanism, a bimetal element, spring based mechanism, a hydraulic mechanism or the like. A preferred embodiment of the present invention provides for use of a piezoelectric linear motor 106 that may provide for raising and lowering of pixel 104 from the initial position 106a to a display position 106b, as described in U.S. Pat. No. 7,498,719 to Piotr et al, incorporated herein by reference as if fully set forth.

Most preferably positioning of pixel 104 may be provided by applying the appropriate power profile to with controller 112 to actuator 106 from the display device's power source 114. Optionally power source 114 may optionally be provided in the form of mains power supply, at least one or more battery, at least one or more photoelectric cell, solar cell, at least one or more super capacitor, or the like power supply source. Optionally power source 114 may be rechargeable by induction, electromagnet, mains power supply.

Most preferably display 100 may be controllably operated automatically, semi-automatically or manually optionally via controller 110 and display activation switch 116. Optionally display activation/deactivation switch may turn display 100 on or off. Optionally activation of device 100 may be wholly controlled with controller 110.

Optionally actuator 106 may be activated to display in three dimension by maneuvering at least one or more pixels 104 to a display position., with actuator activation switch 118. Most preferably activation switch 118 provides for activating actuator 106 to maneuver pixel 104 from an initial position 106a to a display position 106b and back. Most preferably the time to reach the display position is up to about 5 seconds and more preferably 2 or 3 seconds.

Optionally device 100 comprises a communication module 120 providing for wireless, wired, cellular, Bluetooth, optical, RF, IR communication optionally with auxiliary devices (not shown) for example computer, PDA, website, mobile communication device, mobile telephone, call center or the like. Optionally and more preferably communication module 120 provides for communication between article 50 and device 100, as shown in FIG. 1. Optionally communication module 120 may facilitate receiving and/or communicating data from and to auxiliary devices for example by email, SMS. Optionally communication module 120 may provide for wired communication for example through a dedicated port for example including but not limited to a USB port, serial port, RS232, HDMI, firewire or the like direct link port devices.

Optionally device 100 may further comprise a modulation module 130 for modulating data received 15 wherein said controller is further associated with a modulation module 130 for receiving data and modulating data to a format that may be displayed on said display 100, or for activating display 100. For example modulation module 130 may be enable voice activation of display 100 where a voice command may activate actuator 106 to display, for example the current time. Optionally modulation module 130 may for example provide for converting a graphical image into an image appropriate for displayable with device 100.

Optionally modulation module 130 may provide for importing fonts and modulating them to be scalable with device 100 so as to present images and alphanumeric characters according to the imported font.

Optionally device 100 may comprise speaker 140 for relaying audible cues to a user. Optionally speaker 140 may for example be provided to audibly communicate with a visually impaired user or for recreational purposes for example to play music.

Most preferably pixel 104 may be provided with a surface in a plurality of optional shapes and forms for example including but not limited to square, rectangle, round, hexagon, octagon, pentagon, polyhedral, tetrahedral, triangular, heart, smiley, emoticon, spherical, cylindrical, elliptical, shape, geometric shape, image, cartoon character, caricature, or any combination thereof or the like.

Optionally pixel 104 may be provided in the form of a maneuverable light emitting diode ('LED'). Optionally LED type pixel 104 may for example be utilized to illuminate device 100, provide for background image to be displayed, provide shading for more clearly defining a displayed image or the like.

Optionally pixel 104 may provide in a touch sensitive form providing for a touch sensitive display optionally controllable with modulation module 130.

Optionally the pixel 104 resolution within a display panel 102 and/or device 100 is sufficiently high to provide for non-block representation of alphanumeric characters. For example, a display pane 102 may communicate the alphanumeric character '2' in curved non-block alphanumeric form, for example "2, 6" instead of a block form "2,6".

FIGS. 3A-C depict pixel 104 arrangement for individual characters within a display panel 102 and preferred dimensions for panel 102 according to optional embodiment of the present invention.

Optionally and preferably each character in display panel 102 is provided by a collection of pixels 104 including at least 15 pixels arranged in three column and five row matrix (3×5) arrangement, where the inter-pixel distance between neighboring pixels is 0.9 mm. Optionally and preferably up to 13 of 15 pixels are active pixels 104a while 2 of 15 pixels are inactive pixels 104b when displaying alphanumeric characters. Most preferably control of which pixel is active or active is controlled with display controller 110 and actuator controller 112 and based on the character being displayed.

Optionally and preferably up to 4 of 15 pixels are active pixels 104a when solely displaying Braille characters. Optionally and preferably a Braille character active pixels 104a may be selected from a set of pixel location defined by the set of {column 1 row 1; column 3 row 1, column 1 row 3, column 3 row 3} or by pixel location defined by the set of {column 1 row 5; column 3 row 5, column 1 row 3, column 3 row 3} or by pixel location defined by the set of {column 1 row 2; column 3 row 2, column 1 row 4, column 3 row 4}.

Optionally combined simultaneous display of alphanumeric and Braille characters may be provided by an optional embodiment of the present invention where preferably up to 13 of 15 pixels are active pixels 104a including up to four pixel selected from the Braille pixel set defined by {column 1 row 1; column 3 row 1, column 1 row 3, column 3 row 3}.

Optionally a display panel 102 is characterized by a display area of about 15.5 mm×11.6 mm including at least 15 pixels arranged in 3 column and 5 row matrix arrangement (3×5).

Optionally and preferably two adjacent panels 102 may be arranged such that a second display panel is placed 2.3 mm to right or left relative to a first display panel.

Optionally and preferably two adjacent panels 102 may be arranged such that a second display panel is placed 3.4 mm above or below a first display panel.

Optionally device 100 may comprise a plurality of display panels 102 relative to a first panel wherein an adjacent neighboring panel disposed to the right and/or left of the first panel is placed at a distance of 2.3 mm relative to the first panel; and an adjacent neighboring panel disposed above or below the first panel is placed at a distance of 3.4 mm relative to said first panel.

Optionally inter pixel distance between adjacent pixels is about 0.9 mm and a cross section of about 1.6 mm Most preferably pixel 104 may be maneuvered by actuator 106 to be raised or lowered up to about 0.8 mm to a display position. Optionally actuator 106 may maneuver pixel 104 by controllable increments of 0.1 mm. Optionally pixel 104 may be maneuvered at least about 0.5 mm from an More preferably pixel 104 may be maneuvered at least 0.3 mm toward a display position.

FIG. 3B shows an alphanumeric character display panel 102a showing optional alphanumeric character formed with pixels 104, utilizing active pixels 104a and inactive pixels 104b.

FIG. 3A shows a Braille character display panel 102b showing optional Braille character formed with pixels 104, utilizing active pixels 104a and inactive pixels 104b.

Figure 4A:
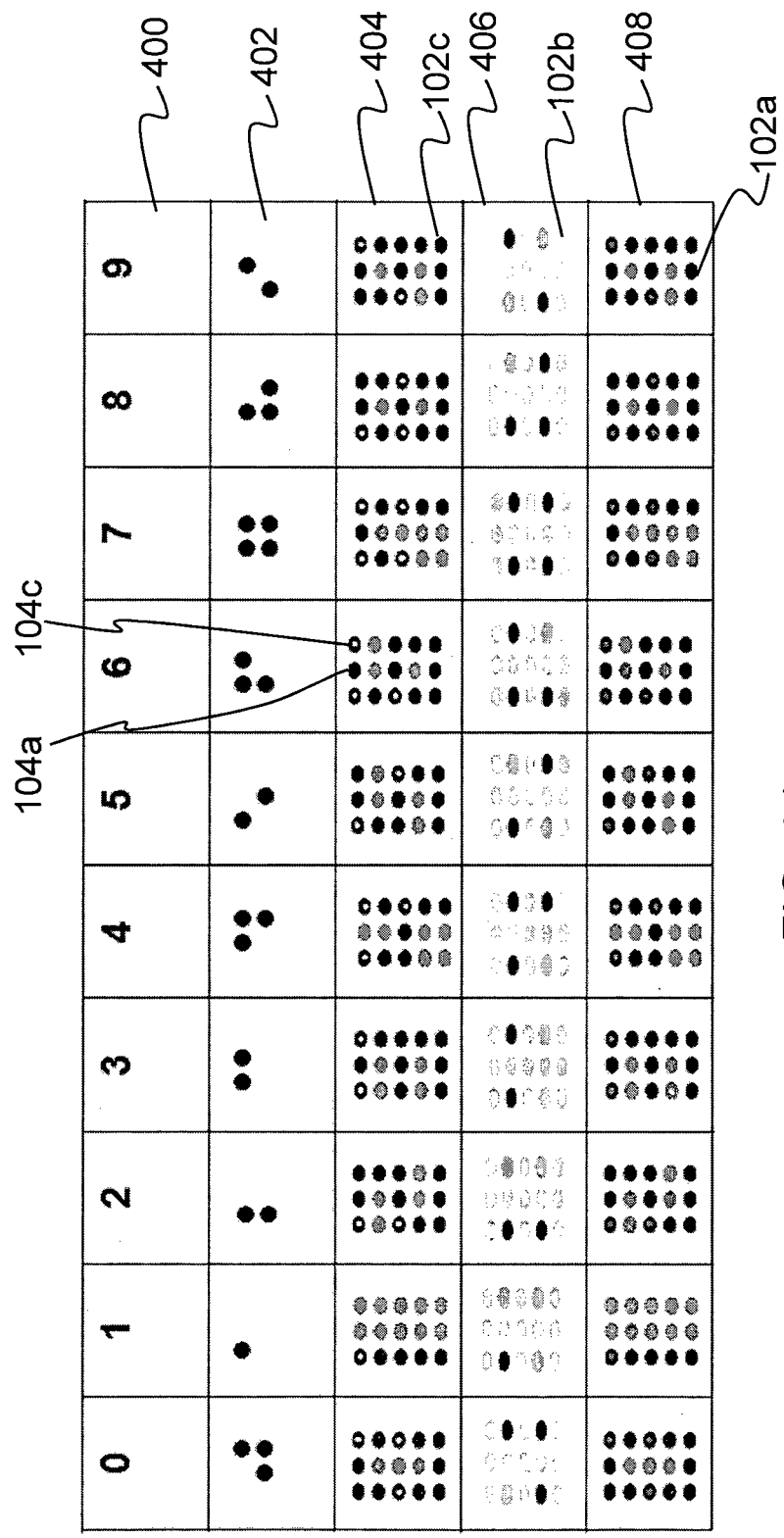
FIG. 4A-B is a chart depicting optional displays of alphanumeric, Braille and combined characters with the display panel according to optional embodiments of the present invention.

FIG. 4A provides a chart showing optional representation with the device 100 according to optional embodiment of the present invention. Row 400 depicts the alphanumeric Arabic numerals that are displayed while row 402 depicts the standard Braille configuration for the numerals represented in row 400. Rows 404, 406 and 408 show optional configuration of optional display panels 102a,b,c.

Row 408 Display showing only alphanumeric representation of the Arabic numerals presenting in row 400 as would be presented with an optional display panel 102a according to optional embodiments of the present invention.

Row 406 shows only Braille representation of the Braille numerals presented in row 402 as would be presented with an optional display panel 102b according to optional embodiments of the present invention.

Row 404 shows only a combined representation including both alphanumeric and Braille character representation therein combining the numerals presented in rows 400 and 402 as would be presented with an optional display panel 102c according to optional embodiments of the present invention. Display panel 102c depicts the combined activated pixel 104c that is preferably disposed at least 0.5 mm above an adjacent pixel 104a providing for both visualizing the displayed character while simultaneously allowing a visually impaired or blind individual to tactually feel the numeral '6' in a proper Braille format while also providing for tactually feeling the full alphanumeric image '6'.

Figure 4B:
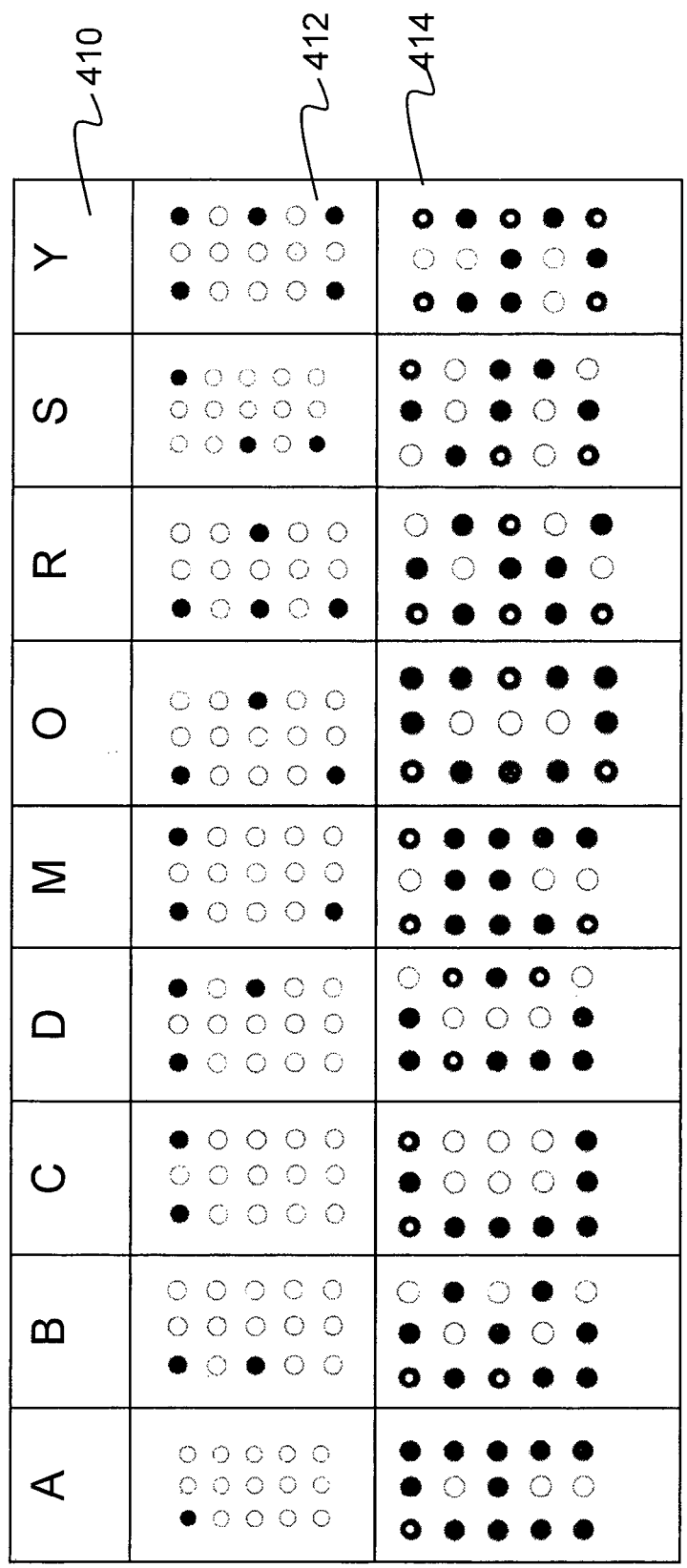

FIG. 4B provides a chart showing schematic depiction of an optional representation of alphanumeric characters with device 100 according to optional embodiment of the present invention. Row 410 depicts a selection of alphanumeric English characters, while row 412 depicts the corresponding Braille representation. Row 414 shows an optional and preferred combined alphanumeric and Braille configuration for the different letters shown in rows 410 and 412.

Figure 5:
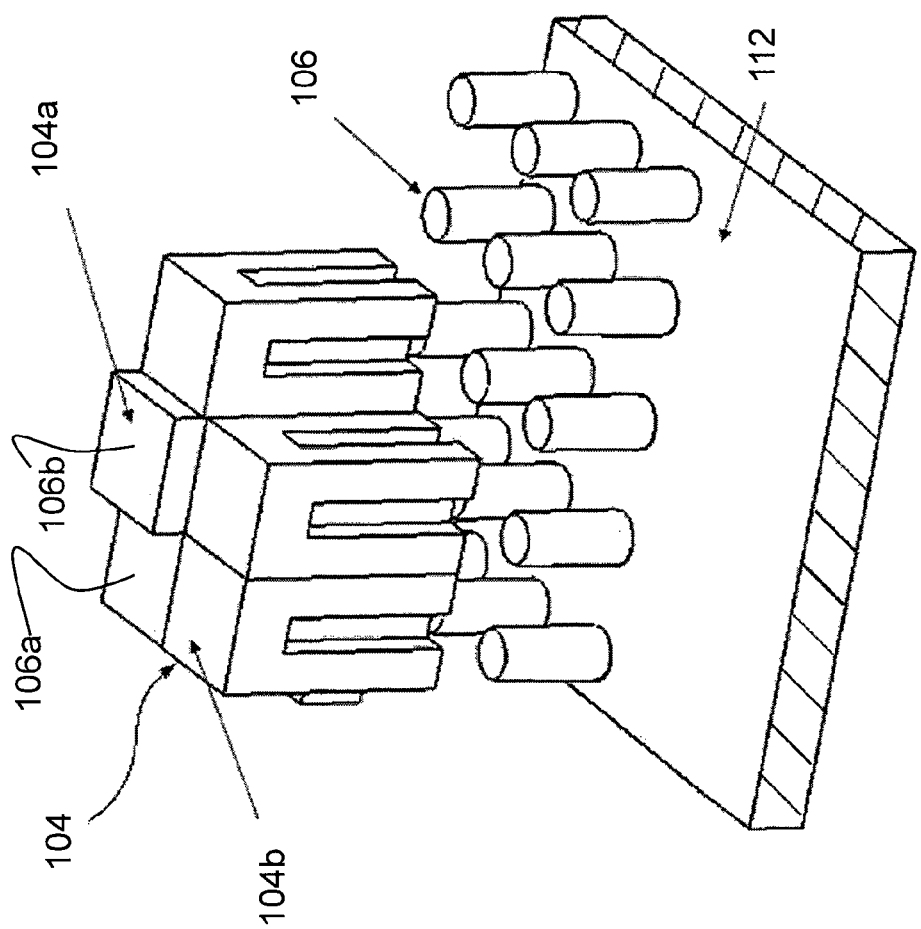
FIG. 5 depicts a simplified structure of the pixel protrusion mechanism as well as an optional piezoelectric power source.

FIG. 5 shows a partial exploded view display panel 102 to reveal the interaction between actuator controller 112, actuator 106, pixels 104, and in particular how a square faced pixel 104 for example is could with actuator 106 and actuator controller 112 to provide for maneuvering pixel 104 from a first position 106a to a display position 106b.

FIG. 6A depicts a simplified structure of an optional pixel actuator maneuvering device 106 according to an optional embodiment of the present invention.

Protrusion core block 505 may comprise an actuator for example including but not limited to a solenoid based shift mechanism or a bimetal element or a hydraulic mechanism, a piezoelectric motor, MEMS motor or the like. Core 505 is activated by voltage Va 506, preferably DC, which is generated by control unit 112 whenever the associated pixel shall be protruded. The protrusion motion 508 is transferred to pixel actuator shaft 106 by a connection shaft 507. Recess 509 is provided to lock shaft 507 in the sunken position by means of spline 510, for example to avoid shifting of pixels 104 when the watch is turned upside down. An similar recess is carved also in the lower part of shaft 507 (not shown) in order to lock it in the raised position.

FIG. 6B-D shows an example of an optional and preferred piezoelectric linear motor as described in U.S. Pat. No. 7,498, 719 to Piotr et al, incorporated herein by reference as if fully set forth. Optionally and preferably a piezoelectric linear motor may be utilized as actuator 106 according to optional embodiments of the present invention, Piezoelectric linear motor comprise a moveable body 40, the movable shaft 30 and a unimorph or bimorph structure comprising at least one piezoelectric or electrostrictive substrate 10/12, and an elastic body 20. The piezoelectric/electrostrictive linear motor is reversibly and linearly moved by an ultrasonic pulse voltage applied to the unimorph (6B-C) or bimorph structure (6D). Control of the relative movement of the load is provided by precisely controlling varying the period of the applied voltage The piezoelectric/electrostrictive linear motor having the above-mentioned construction uses bending movement of a unimorph or bimorph structure including both an elastic body 20 and at least one piezoelectric or electrostrictive substrate 10/12 as its driving source, so that a movable body 40 moves along a movable shaft 30. The piezoelectric linear motor comprises a movable body 40, may for example realized in the form of pixel 104 according to optional embodiments of the present invention, may be moved along moveable shaft 30 by the drive of an appropriate electrical input pulse 'U', for example saw-tooth pulse wave input, into the piezoelectric or electrostrictive substrate 10, causing the elasticity of the elastic body 20 to bend (unimorph or bimorph structure) in response to electrical input at point 'U'. The application of controllable electrical input U provides for moving moveable body 40 in any direction (up and/or down) along shaft 30.

Figure 7A:
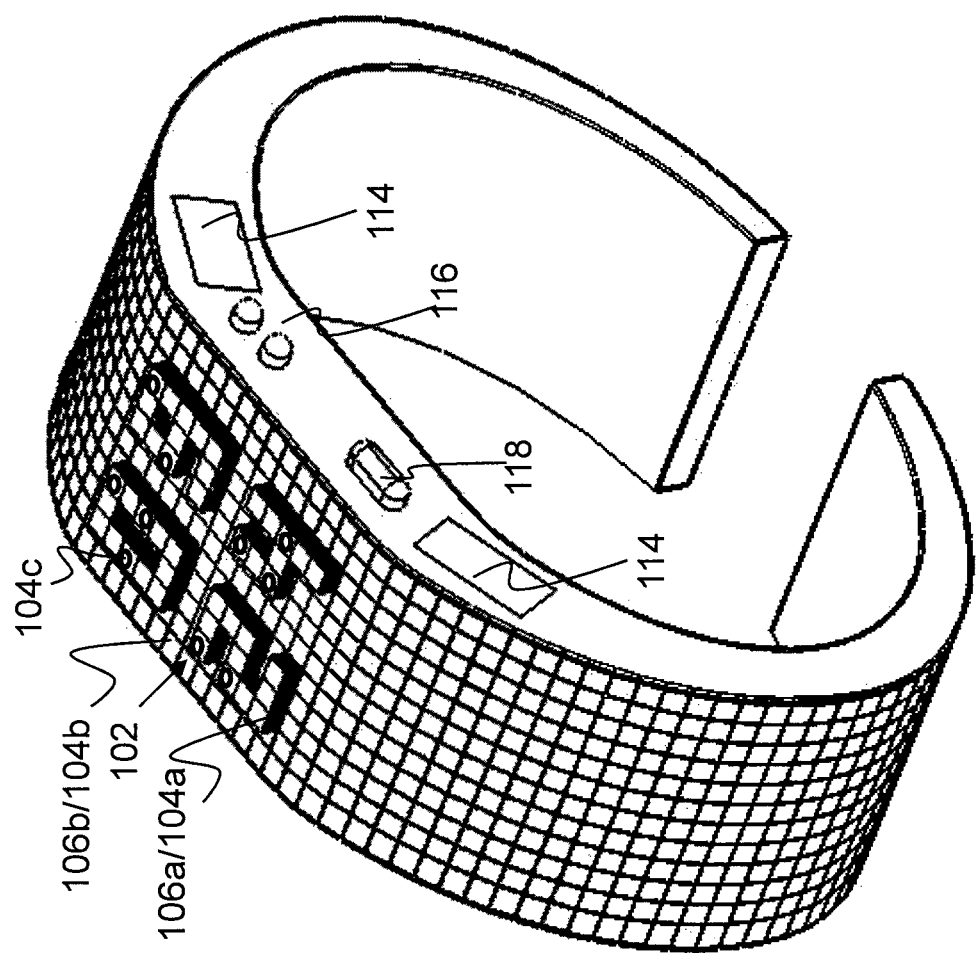
FIG. 7A-B are schematic illustrative diagrams of a watch according to an optional embodiment of the present invention comprising a plurality of display panels in a 2×2 configuration.

FIG. 7A shows an optional embodiment of the present invention where the display device 100 is coupled with a watch 50 assembly to provide for a dual Braille and three dimensional visual watch are provided. Watch 50 comprises power supply 114, display activation switch 116; actuator activation switch 118, as described in FIG. 2. Watch 50 further shows a display 100 having both alphanumeric characters and Braille characters presented on a single display panel 102 utilizing various pixel types combined pixels 104c, active pixels 104a, and inactive pixels 104b, to a user (not shown), to display the time both in three dimensional alphanumeric characters and Braille characters as shown and described in FIG. 4 row 404.

Figure 7B:
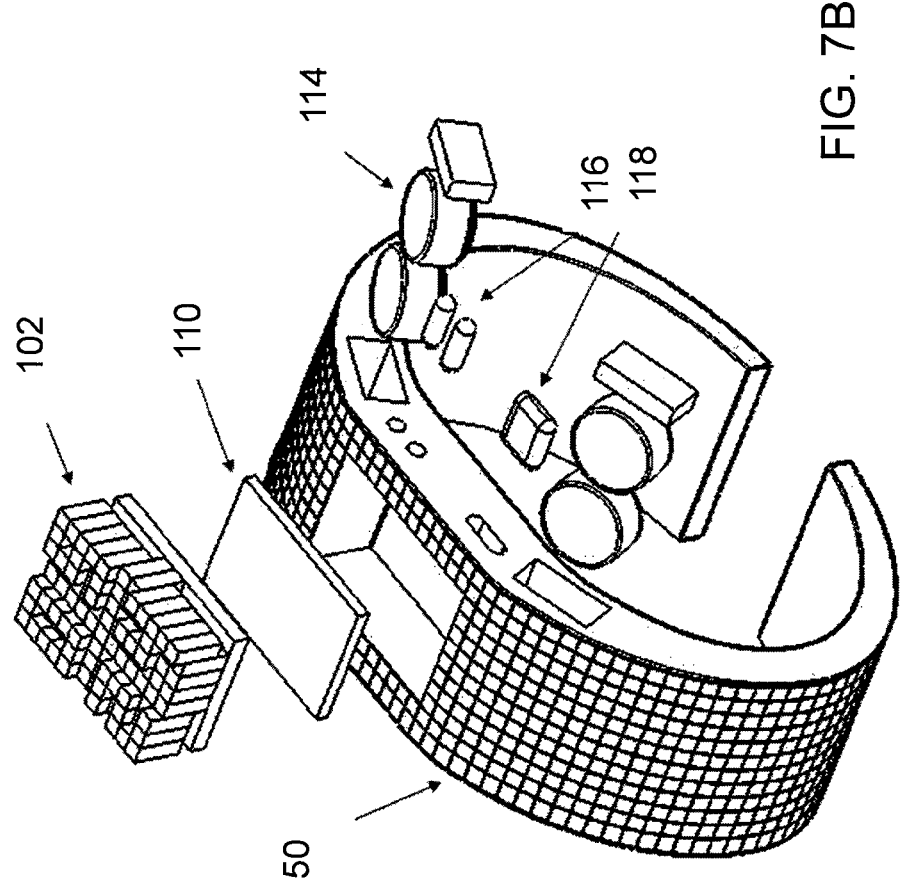

FIG. 7B provides an exploded view of FIG. 7A showing the functional parts as described in FIG. 2 above.

Figure 8B:
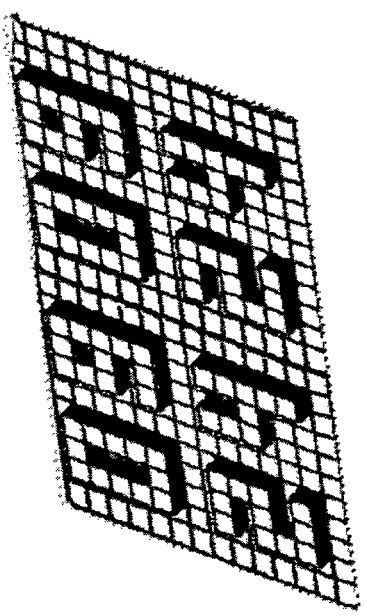
FIG. 8A-B shows schematic illustrative diagrams of an optional display devices implemented with optional devices, such as an alarm clock of FIG. 8A, analog watch 8B and display device comprising a plurality of display panels.
Figure 8A:
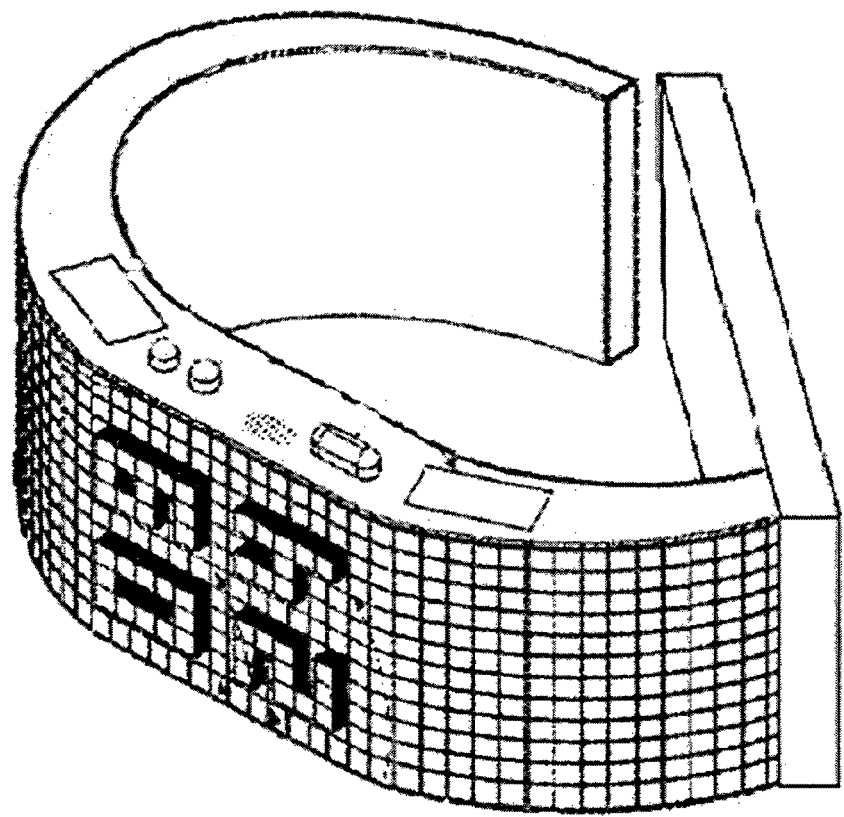

FIGS. 8A-B provide further schematic illustrative depiction of an optional embodiment of the present invention where display 100 is provided in the form of an alarm clock, FIG. 8A and in the form of a display 100, FIG. 8B that may be associated with any device or article 50, as described in FIG. 1.

While the invention has been described with respect to a limited number of embodiments, it will be appreciated that many variations, modifications and other applications of the invention may be made.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

Further modifications of the invention will also occur to persons skilled in the art and all such are deemed to fall within the spirit and scope of the invention as defined by the appended claims.

What is claimed is:

1. A visual and tactile display device both for conveying an image and/or message comprising:
   i. at least one or more display panels wherein each panel comprises a plurality of pixels wherein each pixel is individually maneuvered with an actuator to be raised or lowered from an initial position to a display position, to convey said image and/or message in three dimensions and wherein said conveyed image and/or message is simultaneously conveyed visually and tactually; and characterized in that said pixels are arranged relative to one another [to simultaneously provide for both a visual and tactile representation of the same alphanumeric characters, or] to simultaneously provide for visual, tactile, and Braille representation of the same alphanumeric characters providing a combined display; [and]
   ii. wherein said display panel comprises at least 15 pixels arranged in 3 column and 5 row matrix arrangement wherein the inter pixel distance between adjacent pixels is about 0.9mm; and
   iii. wherein the visual, tactile, and Braille representation are provided by raising/lowering said pixels to at least 3 different heights, based on the representation.

2. The device of claim 1 wherein said pixels may be raised or lowered with said actuator up to about 0.8 mm.

3. The device of claim 1 wherein said display panel is characterized by a display area size corresponding to about 15.5 mm×11.6 mm.

4. The device of claim 1 comprising two adjacent panels arranged such that a second display panel is placed 2.3 mm to right or left relative to a first display panel.

5. The device of claim 1 comprising two display panels arranged such that a second display panel is disposed 3.4 mm above or below a first display panel.

6. The device of claim 1 comprising a plurality of display panels relative to a first panel wherein an adjacent neighboring panel disposed to the right and/or left of said first panel is placed at a distance of 2.3 mm relative to said first panel; and an adjacent neighboring panel disposed above or below said first panel is placed at a distance of 3.4 mm relative to said first panel.

7. The device of claim 4 comprising four display panels in a 2 column and 2 row (2×2) matrix form.

8. The device of claim 1 wherein each pixel has cross section equivalent to about 1.6 mm.

9. The device of claim 1 wherein said pixel is provided with a face shape selected from the group consisting of: square, rectangle, round, hexagon, octagon, pentagon, polyhedral, tetrahedral, triangular, heart, smiley, emoticon, spherical, cylindrical, elliptical, shape, geometric shape, image, cartoon character, caricature, or any combination thereof 10. The device of claim 1 wherein said display panel may convey alphanumeric characters, or Braille characters or a combined character.

11. The device of claim 1 wherein said combined display, displays Braille characters pixel and alphanumeric character pixel with a height differential of about 0.5 mm.

12. The device of claim 8 wherein said Braille characters are presented with a height of at least 0.5 mm relative to a base surface.

13. The device of claim 8 wherein said alphanumeric characters are raised with a height of about 0.8 mm relative to a base surface.

14. The device of claim 1 wherein said actuator is a piezoelectric linear motor providing a force of up to 10 g.

15. The device of claim 1 wherein said display panel is characterized in that it displays at least two alphanumeric characters in a non-block form.

16. The display device of claim 1 further comprising a controller, communication module and a power supply.

17. The device of claim 16 wherein said piezoelectric actuator is controlled with a controller comprising a communication module providing for wireless, wired, cellular, Bluetooth, optical, RF, IR communication.

18. The device of claim 16 wherein said controller is further associated with a modulation module for receiving data and modulating said data to a format that may be displayed on said display.

19. The device of claim 18 wherein said data is provided in digital form.

20. The device of claim 1 wherein the image and/or message conveyed may be selected from the group consisting of time, image, date, message, alarm, reminder, name tag, identification, address, SMS, email, or any combination thereof.

21. The device of claim 1 wherein a plurality of display panels are coupled or otherwise associated with one another.

22. The device of claim 1 wherein said actuator maneuvers said pixel by raising or lowering the appropriate pixels from an initial position, to a display position and back to said initial position.

23. The device of claim 1 wherein the time to maneuver a pixel either for raising or lowing from said initial position to a display position is up to about 5 seconds 24. The device of claim 1 wherein the time to maneuver a pixel either for raising or lowing from said initial position to a display position is up to about 3 seconds.

25. The device of claim 1 wherein the time to maneuver a pixel either for raising or lowing from said initial position to a display position is up to about 2 seconds.

26. The device of claim 1 wherein a pixel is maintained in said display position for up to about 60 seconds.

27. The device of claim 1 wherein a pixel is maintained in said display position for about 10 seconds.

28. The device of claim 1 wherein each pixel is maneuvered relative to at least one or a plurality of neighboring pixels.

29. The device of claim 1 wherein said pixels are touch activated to provide a display.

30. The device of claim 1 wherein said pixels are manually activated to provide a display.

31. The device of claim 1 wherein said image display is activated for a finite period of time based on user preference or resource availability.

32. The device of claim 1 wherein said pixels may be provided in the form of light emitting diode (LED).

33. The device of claim 32 wherein said LED may be used to display a two dimensional background image.

34. The device of claim 32 wherein a two dimensional background image displayable while pixel are activated.

35. The device of claim 18 wherein said modulation module provides for importing images for display.

36. The display of claim 1 wherein said image is formed by relative control of pixels by controlling at least one pixel property selected from the group consisting of relative height, illumination, color, location, or any combination thereof.

37. The display device of claim 1 comprising a plurality of display panels wherein each display panel comprises an individual sub-controller.

38. A watch assembly comprising a plurality of display panels of claim 1 coupled and/or otherwise associated with one another forming a watch band.

39. The display device of claim 1 further comprising a coupled auxiliary device selected from the group consisting clothing, jewelry, computer, mobile telephone, PDA, mobile telecommunication device, medical device, ornamental watch, TV, radio, computer, household device, household appliances, washing machine, or dryer.

40. The display device of claim 37 wherein control of the display device may be provided by an auxiliary device comprising a processor.

41. The device of claim 1 further comprising voice activation wherein a display function is activated based on voice recognition or voice activation.

42. The device of claim 1 further comprising a speaker for audibly communicating the display content.

43. The device of claim 1 wherein at least one or more pixels may be further provided with vibration.

44. The device of claim 41 wherein the selected vibration pixels form Braille characters or combined character display.

45. The display of claim 1 where said pixels are activated via an activation signal communicated from a communication module.

46. The display of claim 43 wherein said signal activation is in the form of an electronic message selected from email or SMS.

47. The display of claim 1 wherein said display is touch sensitive.

48. The display device of claim 1 wherein the display alters between visually based display and tactile display.

49. The device of claim 18 wherein said data is provided in analog form.

* * * * *